United States Patent

Stanaitis

[11] 4,261,402
[45] Apr. 14, 1981

[54] CAPTIVE THREAD FORMING TERMINAL SCREW

[75] Inventor: Peter P. Stanaitis, Rockford, Ill.

[73] Assignee: Textron, Inc., Providence, R.I.

[21] Appl. No.: 958,142

[22] Filed: Nov. 6, 1978

[51] Int. Cl.³ .......................... F16B 41/00; H01R 7/16
[52] U.S. Cl. .................................... 411/371; 339/269; 411/415; 411/416; 411/533
[58] Field of Search ...................... 151/69, 37, 35, 22; 85/1 P, 1 K, 46; 339/269, 272 R, 263 R, 246

[56] References Cited

U.S. PATENT DOCUMENTS

| 2,053,918 | 9/1936 | Peretzman | 85/1 P X |
| 3,372,366 | 3/1968 | Cochrum | 151/37 X |
| 3,638,700 | 2/1972 | Onufer | 151/69 |
| 3,877,339 | 4/1975 | Muenchinger | 151/35 X |
| 4,040,328 | 8/1977 | Muenchinger | 151/22 X |

Primary Examiner—Ramon S. Britts
Attorney, Agent, or Firm—Trexler, Wolters, Bushnell & Fosse, Ltd.

[57] ABSTRACT

A self-tapping, self-captivating fastener is provided for engagement in a predrilled aperture to enable the connection of an electrically conductive element such as a lead wire, or spade type terminal attached to the end of such a wire, to a workpiece or bus bar. The fastener includes a shank and an enlarged driving head, said shank having a threaded portion which includes a thread lead-in portion that tapers and converges in a direction away from the driving head toward an enlarged abutment projection formed at the work entering end of said fastener. The diameter of this abutment projection is less than the diameter of the predrilled aperture and said apertural diameter is less than the crest diameter of the threaded portion. Thus the abutment portion may pass through this aperture with said threaded portion reshaping the periphery of the aperture to form internal mating threads, such that the apertural diameter is reduced to less than that of the abutment portion. Accordingly, upon withdrawal of the thread, said abutment portion will impinge upon the internal threads thereby rendering said fastener captive. In addition, the convergence of said thread lead-in portion is such that when said abutment portion impinges the internal threads, the thread turns upon the lead-in portion are not in contact with said internal thread whereby continued rotation of the fastener will not damage the internal threads.

11 Claims, 5 Drawing Figures

CAPTIVE THREAD FORMING TERMINAL SCREW

BACKGROUND OF THE INVENTION

The present invention relates to a captive thread-forming screw assembly, and more specifically, to a captive thread-forming screw of the type employed to provide an electrical terminal on a bus bar or the like.

It is relatively common practice to employ self-tapping terminal screw in the manufacture of electrical devices so that wires or their metal terminals may be attached to a bus bar or workpiece with a threaded fastener without the necessity of machining internal mating threads in the workpiece to receive each particular fastener. During the manufacturing or assembly process, it is often necessary to retract the fastener with a power driver and to avoid backing the fastener completely out of the workpiece, which would result in an increase in the overall assembly time, captive screws are commonly employed. The captive screws used as terminals are generally of the type shown in FIG. 1 of the drawings and while widely used, this design does possess certain inherent disadvantages, which are overcome to a large extent by the present connector.

More specifically, with the prior art designs, the work entering end of the fastener diverges in a direction away from the driving head and is of a diameter greater than the root diameter but less than the crest diameter of the thread thereon. When the fastener is inserted into a workpiece having an apertural diameter less than the crest diameter of the threads and rotated, internal mating threads are cold formed on the periphery of the aperture with a crest diameter determined as a function of the root diameter of the male thread on the fastener. This results in the reduction of the effective diameter of the aperture sufficient to cause the tapered work entering end to impinge against the internal threads upon retraction, and render the fastener captive in the aperture. However, as these fasteners are retracted with power drivers during assembly or subsequent service, there is a distinct change that the assembler will over rotate the fastener. That is, back the fastener out of the aperture further than is required to attach a lead wire or terminal. When this occurs, the thread turns on the diverging end of the fastener will continue to maintain purchase or engagement with the workpiece thread. As such the enlarged end of the fastener is drawn back through the aperture causing the internal threads previously formed thereon to be destroyed or wiped out. If the over rotation is excessive, which can easily occur with a power driver, the fastener will be backed completely out of the workpiece. The present invention overcomes this problem and achieves other advantages not found in prior art fasteners by providing a design which will not result in damage to the apertural thread when backed out, even if over rotated. More specifically, the present invention provides a design having a tapered lead-in portion disposed intermediate to the thread forming portion and the enlarged work entering or abutment portion. The lead-in portion contains underfilled threads and converges in a direction away from the driving head. As is shown in FIG. 3 and FIG. 5, the underfilled lead-in threads run out on the converging section of the shank as said lead-in threads approach the enlarged abutment projection. This design allows the fastener to be rotated freely while fully retracted, yet captive without destroying the apertural threads in the workpiece. In addition, as this lead-in portion tapers and converges toward the work entering end, the initial engagement of the fastener is facilitated and the driving torque required to cold form the threads in the workpiece is substantially reduced.

DESCRIPTION OF THE ILLUSTRATED EMBODIMENT

Figure 1:
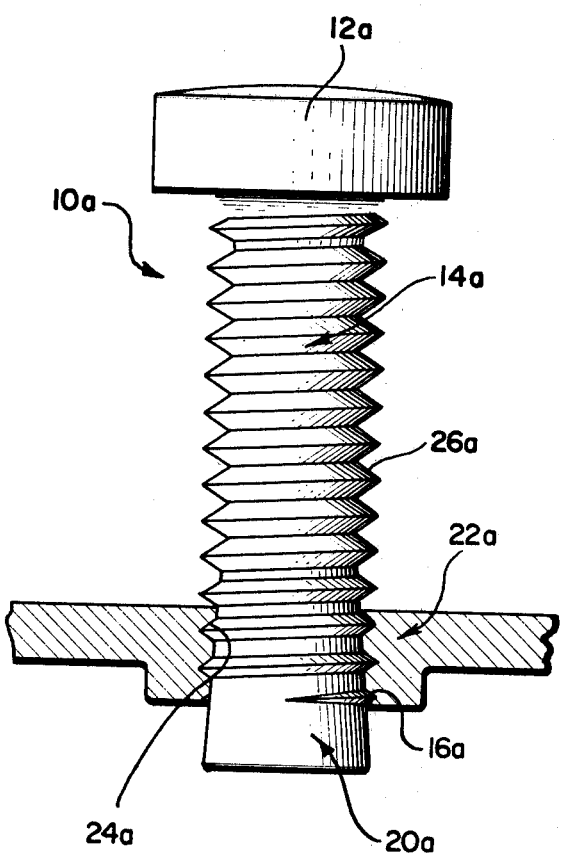
FIG. 1 is an elevational view of a prior art type of captive fastener engaged in a workpiece and fully retracted.

Turning now to the drawings, FIG. 1 illustrates a prior art type of captive fastener engaged in a workpiece and fully retracted. For purposes of further understanding the present discussion and of the inherent problems with the prior art type of captive fastener, a brief discussion will be had as to the structural features of the fastener of FIG. 1. In this regard, the reference characters employed will be designated by the suffix a which suffix will be omitted in the subsequent reference to the structural components of the fastener unit of the present invention.

FIG. 1 illustrates a typical prior art type of captive fastener assembly, designated generally 10a, which includes driving head portion 12a, threaded shank portion 14a, thread forming turns 16a, and enlarged work-entering end portion 20a. Fastener unit 10a is engaged with workpiece 22a through internal mating threads 24a cold-formed by thread forming turns 16a. Said internal threads 24a being mated with external threads 26a on shank portion 14a, the fastener unit may be rotated clockwise by driving head portion 12a to fully engage workpiece 22a. Thereafter upon counterclockwise rotation said fastener 10a may be fully retracted to the position shown in FIG. 1, wherein enlarged head portion 20a impinges against the internal threads 24a of workpiece 22a.

However, as alluded to previously, the principal disadvantage of the prior art self-tapping captive screw becomes apparent, if one envisions continued retraction and rotation from the FIG. 1 position of the fastener unit 10a. In this event, the external thread 26a will maintain purchase or engagement with internal threads 24a, producing further retractional force, which force continues to draw the enlarged work-entering end portion 20a through the internal threads 24a. When this occurs the internal threads 24a will be destroyed or wiped out, permitting the fastener to be disengaged completely from the workpiece 22a. Which of course, results in loss of assembly manufacturing time.

Figure 2:
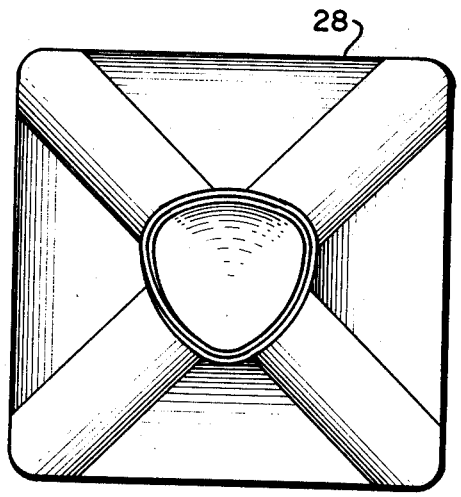
FIG. 2 is a top view of the captive Sems washer depicted in FIGS. 3-5.

Attention is now invited to FIG. 2, wherein the captive fastener assembly 10 of the present invention is illustrated. In this regard, the captive fastener 10 includes a driving head portion 12, a threaded shank portion 14, a tapered lead-in portion 18, and an enlarged work entering or abutment portion 20. The threaded shank portion 14 includes a plurality of thread turns 15, which are completely formed, and preferably of a tri-roundular form adapted to form a complete female thread. The lead-in portion 18, includes thread turns 16 which are also tri-roundular but are of an incomplete or underfilled form. Also shown are the workpiece 22 with predetermined aperture 32 of diameter Z1, and terminal lug 30 to be affixed to workpiece 22 when fastener 10 is fully engaged. In addition a Sems type captive washer 28, as known in the art, is provided to secure a terminal lug 30 on engagement.

The fastener 10 and the workpiece 22 are assembled by inserting the work-entering end 20 through aperture 32. The apertural diameter Z1 is predetermined slightly larger than the end diameter Y of end or abutment portion 20 to allow fast and easy insertion. Underfilled thread-forming turns 16 initially engage the peripheral wall of aperture 32 and upon rotation of the fastener 10 will have purchase with the aperture wall 32, thus, drawing the fastener inwardly to bring the complete thread-forming turns 17 into engagement, with the thread turns 17 serving to cold-form the internal mating threads 34 in aperture 32 of workpiece 22, as shown in FIG. 4.

Figure 3:
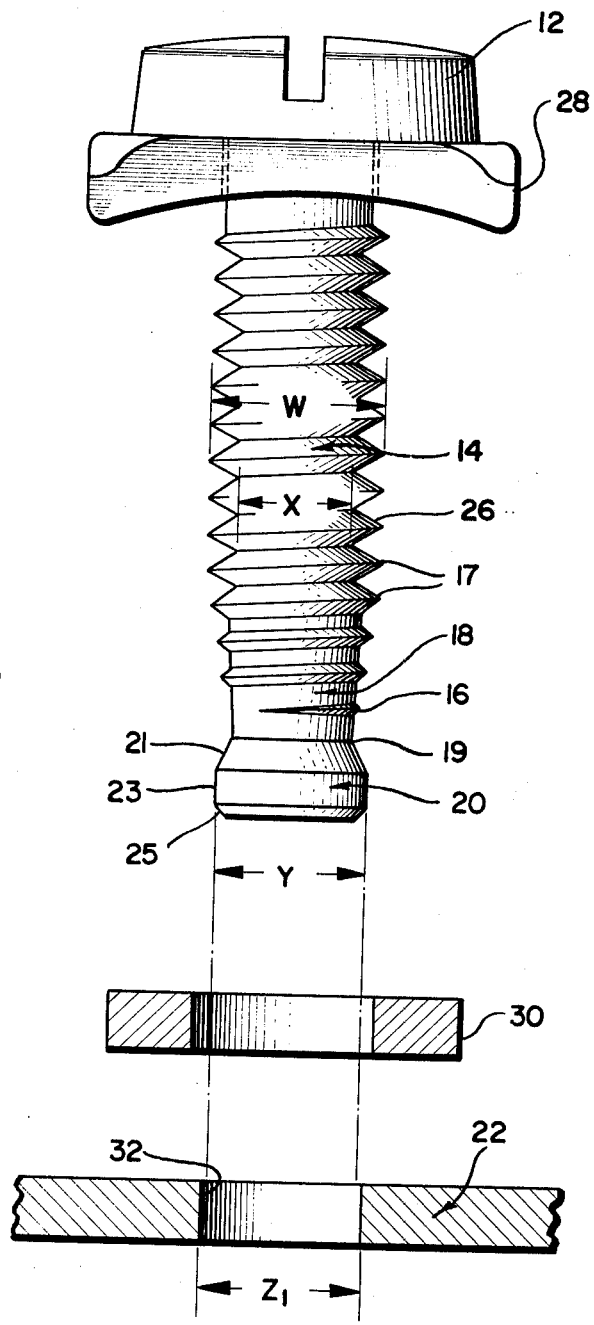
FIG. 3 is an exploded view, partially in section, of the present invention including the workpiece, a terminal lug, and a captive Sems washer.
Figure 5:
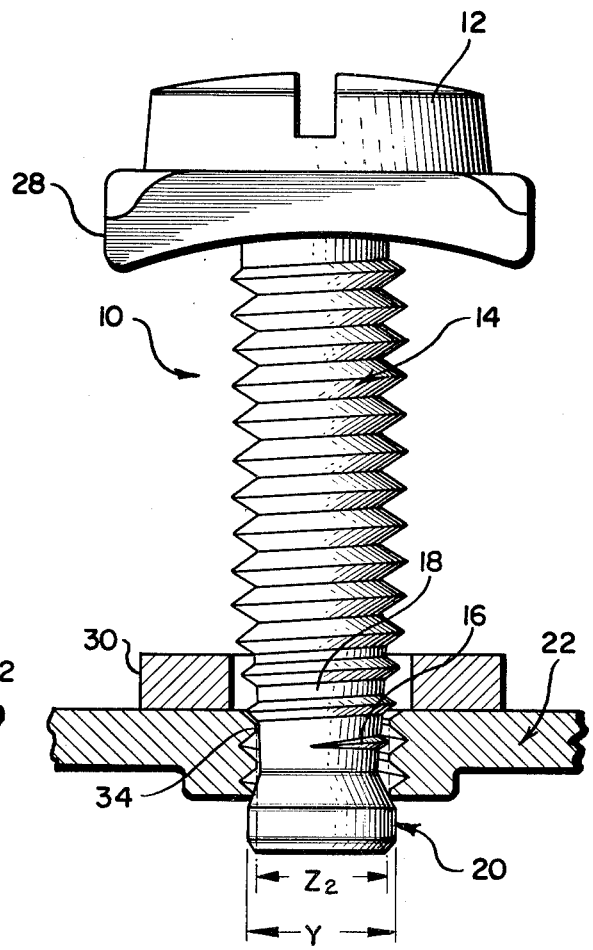
FIG. 5 is an additional view of the FIG. 4 fastener in a fully retracted position.
Figure 4:
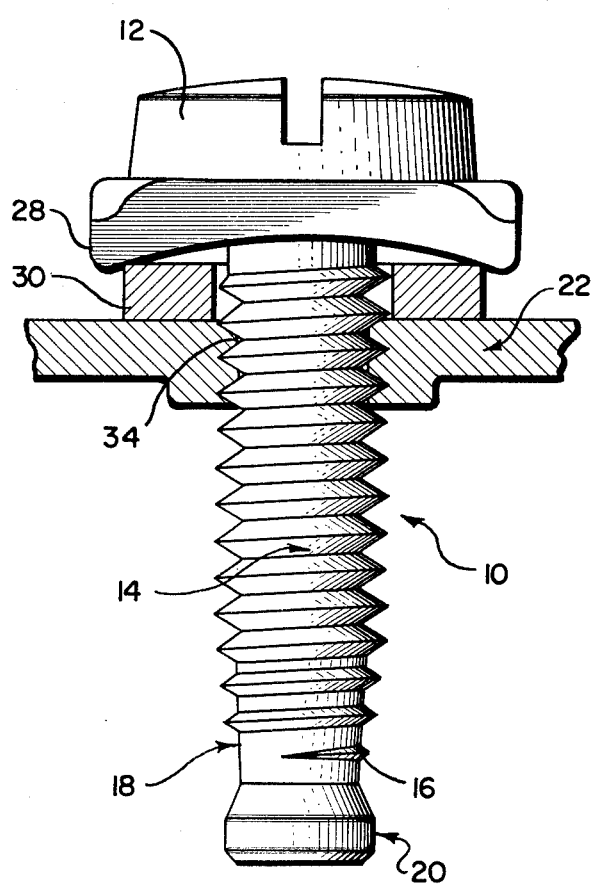
FIG. 4 is an elevational view of the present invention in a fully engaged position including the workpiece and a terminal lug shown in section, and a captive Sems washer.

Turning now to FIGS. 4 and 5, it will be seen that complete engagement of the fastener 10 has cold-formed internal threads 34 in workpiece 22. The dimensions of the internal, or female threads 34 is determined by the root and crest diameters of the thread-forming turns 17, designated X and W, respectively in FIG. 3. More specifically, as shown in FIG. 5, the mating thread 34 has a crest, or bore diameter Z2. The crest diameter Z2, due to the cold forming of thread 34, is sufficiently smaller than the original diameter Z1 of aperture 32, FIG. 3, such that the enlarged work-entering end 20 with its diameter Y can no longer pass back through the workpiece 22, and the fastener 10 is rendered captive with respect to workpiece 22. Thus, by controlling the size of aperture 32 and the dimensions of the thread-forming turns 17, the above-discussed dimensional relationship, viz., Y greater than Z2, is assured.

At this point, a comparison is invited with respect to the fastener 10 and the fastener 10a of the prior art, and attention is directed to a significant structural difference. More specifically, with the design of fastener 10, there is provided a lead-in portion 18, which converges in a direction toward the work-entering or abutment end 20 of the fastener, and upon this lead-in portion 18 there are provided the under-filled lead-in threads 16. The lead-in portion 18 terminates abruptly at the point of juncture 19 with the abutment or end portion 20, which portion 20 includes a first segment having a tapered surface 21 and a second cylindrical surface segment 23. If desired, a slight bevel 25 may also be provided. It should be noted further, that the lead-in thread 16 terminates or vanishes at a location spaced a short distance from the juncture 19. This should be compared with the design of a fastener 10a, wherein the lead-in thread 16a is formed on a portion of the fastener shank which diverges in a direction toward the work-entering end, with the thread 16a actually terminating on the abutment portion 20a.

The advantage of the present invention becomes apparent when considering the fully retracted position of the fastener 10 in FIG. 5, as compared with the previously described fully retracted prior art fastener 10a in FIG. 1. As the fastener 10 is retracted or backed out of the workpiece 22, end or abutment portion 20 will engage the internal thread 34. With fastener 10 of the present invention, when this occurs the existence of the converging, tapered lead-in portion 18 is such that the correspondingly tapered underfilled lead-in threads 16 are not in driving engagement with the internal mating thread 34. Thus the fastener, while captive in the workpiece 22, is free to rotate without producing further retractive forces, and has sufficient freedom of movement that continued over-rotation will not cause the thread forming turns 16 or the enlarged work-entering or abutment portion 20 to destroy or wipe out the internal mating threads 34.

While prior art fastener designs, such as fastener 10a of FIG. 1 require assemblers or service workers to take great care to avoid over-rotation of the fastener assembly, the lack of purchase or engagement between the lead-in portion 18, internal mating threads 34, and abutment portion 20, with the fastener 10 of the present invention allow retraction of the fastener 10 without fear of destruction of the internal threads 34 through over-rotation. In addition, it should be noted that the tapered thread lead-in portion 18 and underfilled lead-in threads 16 co-act with aperture 32 as shown in FIG. 3 to facilitate initial engagement and holding of the fastener 10 perpendicular to workpiece 22 upon insertion, and greatly reduce the driving torque necessary to cold-form threads in workpiece 22.

While there has been disclosed herein a preferred embodiment, it is by no means intended that this define the full limits of the present invention. Applicant is well aware that those skilled in the art may readily devise various modifications, changes or alterations from the specific design shown, which do not depart from the spirit and scope of the invention, as are defined by the claims appended hereto.

The invention is claimed as follows:

1. In combination, a self-tapping, self-captivating fastener member and a relatively thin workpiece having a pre-drilled aperture of predetermined size formed therein, said fastener member including a driving head and an elongate shank extending from said driving head, said shank having a threaded portion formed thereon, said threaded portion including a plurality of thread-forming turns adapted to form an internal mating thread on said aperture wall upon engagement of the fastener member in said aperture, and a thread lead-in portion which includes one or more incomplete or underfilled thread turns, said thread lead-in portion being tapered and converging in a direction away from said driving head and of a length greater than the depth of the pre-drilled aperture, and an enlarged abutment portion formed on said shank adjacent the terminus of said lead-in portion, and having a maximum diameter which is greater than the minimum diameter of said thread lead-in portion, and also greater than the crest diameter of the mating internal thread to be formed by said thread-forming turns, whereby upon assembly of said fastener member with said workpiece, said abutment portion may pass through said aperture with said thread-forming turn reshaping said aperture periphery to form said internal mating thread, such that upon attempted removal of said fastener, said abutment portion will engage said internal threads thereby rendering said fastener captive with respect to said workpiece, and further due to the lead-in portion being of a length greater than the depth of said pre-drilled aperture, the convergence of said thread lead-in portion and the incomplete thread turns thereon when said abutment portion engages said internal thread, the thread turns on said lead-in portion proximate said internal thread will be of insufficient crest height to effect mating, driving engagement with said internal thread, such that continued rotation of the fastener member will not result in withdrawal of the fastener from the aperture and damage to said internal thread which would result from said abutment portion passing through said internally threaded aperture.

2. In combination, a self-tapping, self-captivating fastener member and a relatively thin workpiece having a pre-drilled aperture of predetermined size formed therein, said fastener member including; a driving head, an elongated shank extending from said driving head, said shank having formed thereon a threaded portion and an abutment portion disposed adjacent said threaded portion, said threaded portion including a thread lead-in portion and a plurality of thread-forming turns of a size and configuration to engage said aperture periphery and form a mating internal thread thereon, said abutment portion being sized such that the maximum diameter thereof is less than the diameter of said aperture but greater than the crest diameter of the internal threads to be formed thereon, whereby upon assembly, said abutment portion will pass through said aperture but subsequent to the formation of said internal thread, said fastener member cannot be disassembled since the internal thread will preclude said abutment portion from passing out of said aperture, the improvement wherein, said thread lead-in portion is tapered and converges in a direction away from said driving head, terminating at its minimum diameter section adjacent said abutment portion, with the thread turns on said lead-in portion being incomplete or underfilled, the spacing of said abutment portion from said lead-in portion and the length of said lead-in portion having a combined axial extent greater than the depth of said aperture, such that when said abutment portion engages said workpiece upon attempted withdrawal of said fastener member, only said incomplete, underfilled thread turns of the lead-in portion will be disposed proximate said internal thread, with none of the thread forming turns being in mating engagement therewith, said lead-in portion thread turns being of insufficient height to effect mating, driving engagement with said internal thread, such that continued rotation of said fastener member will not result in withdrawal of the fastener and damage to said internal thread, as would result from said abutment portion passing through said aperture.

3. The combination according to claim 1 or claim 2, wherein said shank includes an unthreaded portion intermediate said threaded portion and said driving head, and there is further provided a washer member carried on said unthreaded portion, said washer member being maintained captive on said shank by said thread turns and said driving head.

4. The combination according to claim 1 or claim 2, wherein said enlarged abutment portion includes a tapered section extending from the terminus of said lead-in portion, said tapered section diverging in a direction away from said driving head.

5. The combination according to claim 4, wherein said abutment portion further includes a cylindrical section extending axially of said tapered section, and said abutment portion defines the work-entering end portion of said fastener member.

6. The combination according to claim 1 or claim 2, wherein said thread lead-in portion is formed on a shank section which also converges in a direction away from said driving head, with the thread on said lead-in portion running out at a location spaced axially from said enlarged abutment portion.

7. The combination according to claim 1 or claim 2, wherein said thread-forming turns are of a multi-lobular configuration.

8. In combination, a self-tapping, self-captivating fastener member, and a relatively thin workpiece having an aperture formed therein to a predetermined size, said fastener member including a driving head and an elongate shank extending from said driving head, said shank having a threaded portion formed thereon, said threaded portion including a plurality of thread-forming turns adapted to form an internal mating thread on said aperture periphery upon engagement of the fastener member with said workpiece, and a thread lead-in portion which includes one or more incomplete or underfilled thread turns, said thread lead-in portion being tapered and converging in a direction away from said driving head, and an enlarged abutment portion formed on said shank adjacent the terminus of said lead-in portion, and having a maximum diameter which is less than that of said workpiece aperture, but greater than the minimum diameter of said thread lead-in portion, and also greater than the crest diameter of the mating internal thread to be formed by said thread-forming turns, whereby upon assembly of said fastener member with said workpiece, said abutment portion may pass through said aperture with said thread forming turns reshaping said aperture periphery to form said internal mating threads the spacing of said abutment portion from said lead-in portion and the length of said lead-in portion having a combined axial extent greater than the depth of said aperture, such that when said abutment portion engages said workpiece upon attempted withdrawal of said fastener member, only said incomplete, underfilled thread turns of the lead-in portion will be disposed proximate said internal thread, with none of the thread forming turns being in mating engagement therewith, said lead-in portion thread turns being of insufficient height to effect mating, driving engagement with said internal thread, such that continued rotation of said fastener member will not result in withdrawal of the fastener and damage to said internal thread, as would result from said abutment portion passing through said aperture.

9. The combination according to claim 8 wherein the thread on said lead-in portion runs out at a location spaced axially from said enlarged abutment portion.

10. The combination according to claim 8, wherein said thread-forming turns are of a multi-lobular configuration.

11. A self-tapping, self-captivating terminal fastener member for engagement in a pre-drilled aperture of predetermined size formed in a relatively thin workpiece wherein said fastener upon assembly will provide a captive terminal connection, said fastener member including: a driving head, an elongate shank extending from said driving head, said shank having thereon a threaded portion and an abutment portion on the work entering, free end of said shank, said threaded portion including a thread lead-in portion and a thread forming portion said thread forming portion comprising a plurality of thread turns of a size and configuration to engage said aperture periphery and form a mating internal thread thereon, said thread lead-in portion including a tapered shank segment which converges in a direction toward said fastener work entering end and terminating at its minimum diameter section adjacent said abutment portion a thread formed on said tapered shank segment of said lead-in portion, the crest diameter of said thread decreasing in height and thereby tapering in the same direction as said shank segment and at least the last thread turn on said thread lead-in portion being incomplete or underfilled and having a crest diameter that is less than the crest diameter of the internal thread to be formed, as determined by the dimensions of said threads on the thread forming portion, said abutment portion being spaced from the terminus of said incomplete or underfilled thread turn on the lead-in portion and sized such that the maximum diameter thereof is less than the diameter of said pre-drilled aperture in the workpiece, but greater than the crest diameter of the internal thread to be formed on said workpiece, as determined by the dimensions of said thread turns on the thread forming portion, such that upon initial assembly, said abutment portion will pass through said pre-drilled aperture, but subsequent to the formation of the internal threads said fastener member cannot be disassembled since the internal threads will have a crest diameter less than the diameter of said abutment portion and will thus preclude said abutment portion from passing out of said aperture, the spacing of said abutment portion from said terminus of the thread turn on said lead-in portion, and the length of said thread on the lead-in portion that is of lesser diameter than the crest diameter of said internal thread being selected to be greater than the normal thickness of workpieces to be employed in conjunction with a captive terminal fastener, such that when said fastener member is retracted and said abutment portion engages said workpiece upon attempted withdrawal of said fastener, only the portion of the terminus of said thread having a crest diameter less than the crest diameter of the internal thread will be disposed proximate said internal thread formed on the workpiece, and therefore none of the thread turns on said fastener will be in mating, driving engagement with said internal thread, such that continued rotation of said fastener member will merely result in spinning of the fastener relative to the workpiece, and will not produce withdrawal of the fastener abutment portion through said internally threaded aperture, which would damage the internal thread previously formed thereon.

* * * * *